United States Patent
Cai et al.

(10) Patent No.: US 11,602,728 B2
(45) Date of Patent: Mar. 14, 2023

(54) COMPOSITE ADSORBENTS AND METHOD OF MAKING THEM

(71) Applicant: Novoreach Technologies LLC, Midland, MI (US)

(72) Inventors: Jun Jason Cai, Midland, MI (US); Jia Julia Liu, Midland, MI (US)

(73) Assignee: Novoreach Technologies LLC, Midland, MI (US)

( * ) Notice: Subject to any disclaimer, the term of this patent is extended or adjusted under 35 U.S.C. 154(b) by 219 days.

(21) Appl. No.: 16/801,392

(22) Filed: Feb. 26, 2020

(65) Prior Publication Data

US 2020/0276556 A1 Sep. 3, 2020

Related U.S. Application Data

(60) Provisional application No. 62/812,430, filed on Mar. 1, 2019.

(51) Int. Cl.

| | | |
|---|---|---|
| *B01J 20/18* | (2006.01) | |
| *B01J 20/20* | (2006.01) | |
| *B01J 20/30* | (2006.01) | |
| *B01J 20/32* | (2006.01) | |
| *B01J 20/28* | (2006.01) | |

(52) U.S. Cl.
CPC ............... *B01J 20/18* (2013.01); *B01J 20/20* (2013.01); *B01J 20/2803* (2013.01); *B01J 20/3007* (2013.01); *B01J 20/3028* (2013.01); *B01J 20/3078* (2013.01); *B01J 20/3085* (2013.01); *B01J 20/3217* (2013.01)

(58) Field of Classification Search
CPC ......... B01J 20/18; B01J 20/20; B01J 20/2803
See application file for complete search history.

(56) References Cited

U.S. PATENT DOCUMENTS

2013/0312668 A1  11/2013  Boxley et al.

FOREIGN PATENT DOCUMENTS

CN  101053826 A  10/2007

OTHER PUBLICATIONS

Jha et al., Journal of Hazardous Materials, (2008), v.160, p. 148-153. (Disclosed in IDS).*
Rossi et al. Journal of Materials Letters, (2019), v.236, p. 644-648, published Nov. 5, 2018.*
Sricharoenchaikul et al., Energy and Fuels, (2008), v22, p. 31-37.*
Rossi et al., Constrand Build Mater, (2018), v191, 39-46.*
K.Y. Foo, B.H. Hameed, "The environmental applications of activated carbon/zeolite composite materials", Advances in Colloid and Interface Science, 162 (2011), 22-28.
Vinay Kumar Jha et al.,"Sorption properties of the activated carbon-zeolite composite", J. of Hazardous Materials, 160 (2008), 148-153.
Jinghong Ma et al., "CO2 adsorption on zeolite X/activated carbon composites", Adsorption 18 (2012), 503-510.

* cited by examiner

*Primary Examiner* — Yong L Chu
(74) *Attorney, Agent, or Firm* — Technology Law; Karen L Kimble

(57) ABSTRACT

A composition for making composite adsorbents from a mixture of geopolymer, zeolite and activated carbon wherein a geopolymer material, a carbonaceous material, and an alkali activating agent are the components of the mixture. The alkali activating agent to carbonaceous material solid mass ratio is at least 0.25:1, respectively. A process for producing shaped composite adsorbents from the composition is done using conventional means such as mixing, shaping, extrusion and other methods. Alkali activation is used to convert the carbonaceous material to activated carbon, followed by hydrothermal treatment to convert the geopolymer material to zeolites. Shaped composite adsorbents fabricated from the composition of the instant invention are used for adsorption, purification, or other separation applications of liquids and gases.

20 Claims, 2 Drawing Sheets

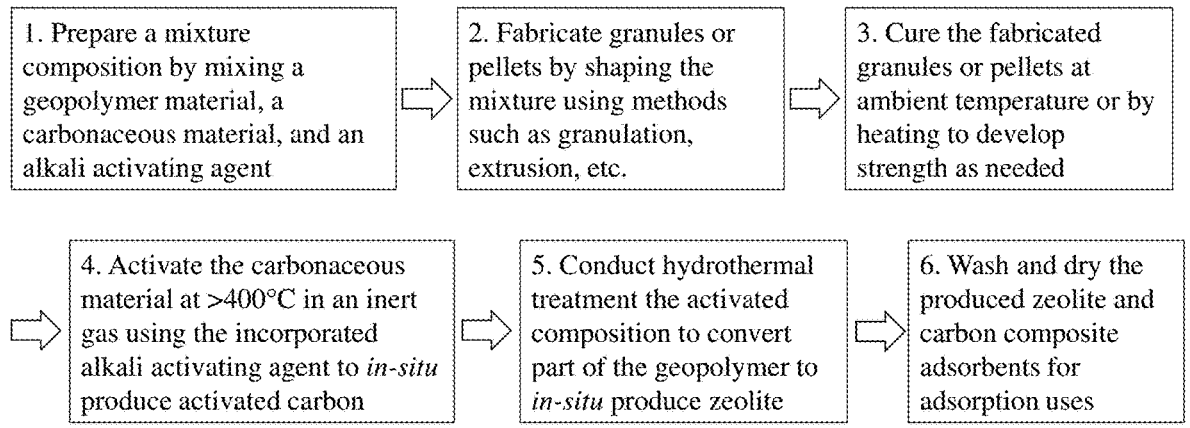
Figure 1
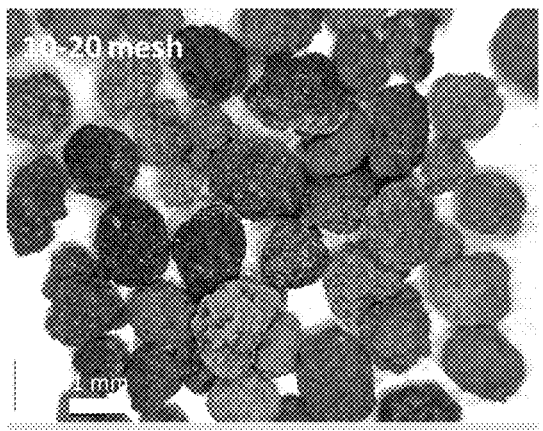 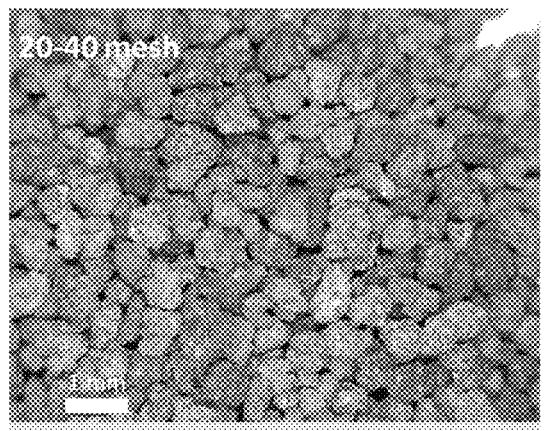
Figure 2A                                     Figure 2B

COMPOSITE ADSORBENTS AND METHOD OF MAKING THEM

This application contains subject matter based upon work that is supported by the National Institute of Food and Agriculture, U.S. Department of Agriculture Small Business Innovation Research (SBIR) Program, under award No. 2019-33610-30165.

FIELD OF THE INVENTION

The instant invention relates to a composite adsorbent composition and process of making them. In particular, the composite adsorbent composition and process relate to mixing, shaping, alkali activation, and hydrothermal treatment of a mixture composition comprised of a geopolymer material, a carbonaceous material, and an alkali activating agent to produce composite adsorbents comprised of zeolite and activated carbon with suitable shapes and sizes for adsorption applications.

BACKGROUND OF THE INVENTION

With increasing global industrialization, hazardous pollutants such as heavy metals, organic compounds, and pesticides are being produced in greater quantities by chemical, pharmaceutical, textile, agricultural, and many other industries. Since these pollutants pose serious environmental and health threats, environmental regulations require that they are removed from waste streams such as wastewater before discharging into the environment or reuse. Adsorption is the most favorable method used to remove pollutants from wastewater due to its efficiency, high adsorption capacity, and low operational cost. Presently, zeolites and activated carbon are the most widely used adsorbents for pollutant removal.

Zeolites are porous crystalline aluminosilicates that consist of assemblies of $SiO_4$ and $AlO_4$ tetrahedra joined together. They have an open structure framework with many channels and interconnected voids of discrete size generally in the range of 0.3-1 nanometer (nm). The channels are occupied by cations and water molecules. Each $AlO_4$ tetrahedron in the framework bears a net negative charge which is balanced by a cation. The cations can be reversely exchanged for other ions with the same charge when aqueous solutions of ion are passed through channels and voids. Therefore, zeolites are excellent adsorbents for inorganic pollutants such as heavy metal and ammonium, even at high concentration levels such as a few parts per million (ppm) or higher due to their high ion exchange capacity.

Zeolites have been broadly employed for diverse purposes including separation and adsorption processes. For continuous processes of liquid and gas applications, granular zeolites are commonly used to achieve low pressure drop, easy operation and regeneration, and long operational life. Although zeolites are excellent inorganic pollutant adsorbents, they are much less effective in removing organic compounds, especially large size organic molecules, due to the small size (0.3-1 nm) of the zeolite channels and the hydrophilic nature of most zeolite materials.

Activated carbon, on the other hand, generally has pores in a wide size range from about one nanometer (nm) to a few micrometers (μm) and is hydrophobic in nature. Typical activated carbon has a surface area of hundreds of square meters per gram, allowing the accumulation of a large number of pollutant molecules. Owing to its high surface area, broad pore size distribution, and high surface reactivity, activated carbon is very effective in removing organic compounds, including large aromatic hydrocarbons. However, activated carbon is less effective in adsorbing inorganic pollutants compared with zeolites and is generally not used for treating waste streams with high concentrations of inorganic pollutants.

Activated carbon is available in a variety of forms including powdered activated carbon (PAC) and granular activated carbon (GAC), and extruded activated carbon (EAC). PAC is pulverized carbon with a size predominantly less than 0.18 mm (US Mesh 80) while GAC and EAC are particles or cylinders with sizes ranging from 0.2 to 5 mm. PAC is typically used in applications such as decolorization, food processing, and pharmaceuticals. GAC is frequently used in continuous processes of gas and liquid phase applications while EAC is most often used for gas phase applications. Shaped activated carbon such as GAC or EAC has a number of advantages over PAC including lower pressure drop, regeneration and reusability, as well as high hardness and low attrition.

For the treatment of complex wastewater containing both inorganic and organic pollutants, to improve pollutant adsorption performance, hybrid adsorbent systems consisting of zeolite and activated carbon adsorbents in series are used in industrial applications. Using such systems results in larger system footprints, increased system cost, and longer treatment time. One approach is combining zeolite and activated carbon in one adsorbent material system. A few examples of such combined systems are provided below.

Foo et al., in "The Environmental Applications of Activated Carbon/Zeolite Composite Materials", Advances in Colloid and Interface Science, 2011, 162, 22-28, reviews commonly used methods to prepare zeolite and carbon composite adsorbents. The most common methods presently used to make zeolite and carbon composite adsorbents involves the use of pre-produced zeolite as one material component and pre-produced activated carbon or a carbonaceous precursor material such as an organic polymer as another material component. A binder is often used to enable shaping of and/or provide mechanical strength to the final adsorbent product. The use of pre-produced zeolite and/or pre-produced activated carbon results in high costs of composite adsorbents.

Boxley et. al. teaches in published US Patent Application US2013/0312668 Al a method of making an absorbent material by mixing a mixture composition comprising pozzolanic ash, an alkaline activator, and water to initiate a geopolymerization reaction, forming an agglomerated mixture, and collecting the agglomerated mixture as adsorbents. Additional ingredients including zeolites and activated carbon can be further added. Pre-produced zeolites and activated carbon are used to produce the adsorbent material. No zeolite or activated carbon is in-situ produced in the adsorbent material.

CN Patent Application CN101053826A describes a geopolymer adsorbent preparing method comprising three components: geopolymer materials, solid adsorption media, and metal chloride media (for example, $CaCl_2$, $SrCl_2$, $MgCl_2$, etc.). The solid adsorption media comprises zeolite and activated carbon. Pre-produced zeolites and activated carbon are used as the solid adsorption media to produce the adsorbent material. No zeolite or activated carbon is in-situ produced in the adsorbent material.

Jha et al., in "Sorption Properties of The Activated Carbon-Zeolite Composite Prepared From Coal Fly Ash For $Ni^{2+}$, $Cu^{2+}$, $Cd^{2+}$ and $Pb^{2+}$", Journal of Hazardous Materials, 2008, 160, 148-153, teaches a method of preparing zeolite and carbon composite adsorbent using coal fly ash which contains fly ash and unburned carbon residue. The coal fly ash powder is fused with NaOH and then ground and subjected to hydrothermal treatment to form zeolite. As a result, a zeolite and carbon composite material is produced in a powder form, which is less preferable than shaped adsorbents for continuous adsorption processes for liquid or gas separation applications.

Ma, et al., in "$CO_2$ Adsorption on Zeolite X/Activated Carbon Composites", Adsorption, 2012, 18, 503-510, teaches a method of making zeolite and carbon composites using a mixture of kaolinite-rich Elutrilithe, silica, and pitch powder. The mixture is extruded to a cylinder shape and then undergoes a 2-step physical activation process at 850° C. which involves carbonization in $N_2$ and activation in $CO_2$. The activated sample is hydrothermally treated to form zeolite and produce zeolite-carbon composite pellets.

Therefore, to date these attempts to form such a combination system have had drawbacks or other difficulties including the following: high material costs due to the use of pre-produced zeolites and activated carbon, high production costs due to a 2-step high temperature physical activation process, blockage of adsorbent pore access by binders, lack of desired adsorbent shapes and sizes for continuous adsorption processes, low mechanical strength, and others. Clearly, producing high performance and low cost zeolite and carbon composite adsorbents with desired shapes and sizes is desired.

SUMMARY OF THE INVENTION

To address the adsorption limitations of individual zeolite and activated carbon adsorbent in the treatment of complex waste streams containing both inorganic and organic pollutants, a new type of adsorbent material with zeolite and carbon composite composition is needed to combine the advantages of individual zeolite and activated carbon adsorbents for effective removal of both inorganic and organic pollutants. Combining two different types of adsorbent materials with different surface properties and pore structures, such a zeolite and carbon composite adsorbent can offer a versatile and effective adsorption solution to removing both inorganic and organic pollutants from waste streams. This invention describes a way to achieve such a combination adsorbent material.

It is desired to use cheap zeolite and activated carbon precursor materials to produce shaped adsorbents with good strength, by using an efficient shaping process, followed by undergoing a simple 1-step chemical activation process using the activating agent included in the mixture composition to in-situ produce activated carbon and then a hydrothermal treatment process to in-situ produce zeolite to form shaped zeolite-carbon composite adsorbents. The present invention discloses a composite adsorbent composition and production method that utilizes a mixture composition comprised of a geopolymer material, a carbonaceous material, and an alkali activating agent to produce composite adsorbents comprised of zeolite and activated carbon through mixing, shaping, alkali activation, and hydrothermal treatment to achieve desirable shapes and sizes for adsorption applications. Specifically, this invention provides a process for producing composite adsorbents having components of geopolymer, zeolite, and activated carbon, comprising:

a. mixing a geopolymer material, a carbonaceous material, and an alkali activating agent, wherein the alkali activating agent to carbonaceous material solid mass ratio is at least 0.25:1, respectively, to produce a paste mixture wherein the paste mixture has a uniform composition and desired rheology for shaping, b. fabricating the paste mixture using common adsorbent shaping methods, including granulation or extrusion, to form granule or pellet compositions possessing suitable sizes for adsorption processes, c. curing the granule or pellet compositions as needed at ambient temperature or by heating to increase strength, d. chemically activating the carbonaceous material in the granule or pellet compositions at a temperature of greater than about 400° C. in an inert gas using the alkali activating agent present in the compositions to in-situ produce activated carbon, e. conducting hydrothermal treatment of the composition to convert part of the geopolymer to in-situ produce zeolite and form the composite adsorbents, and f. washing and drying the produced composite adsorbents.

The process provides a composite adsorbent that is effective to remove both organic and inorganic undesired compounds from liquids and gases. The requirement of steps (d) and (e) make this process able to provide the composite adsorbent as one mixture, made at low cost, and provides an easier to use single composite adsorbent in the waste streams and provides lower processing costs of the waste stream.

One aspect of the present invention is a mixture composition comprised of: a geopolymer material; a carbonaceous material; and an alkali activating agent. The alkali activating agent to carbonaceous material solid mass ratio is at least 0.25:1, respectively. This mixture composition allows shaping of the mixture to form granules or pellets. The development of sufficient material strength of the composition is done through geopolymerization at ambient or slightly elevated temperature for further processing to produce the composite adsorbents. The alkali activating agent included in the mixture composition enables alkali activation of the carbonaceous material at high temperatures in an inert atmosphere to in-situ produce activated carbon. The geopolymer material not only provides mechanical strength to the adsorbents but also can be partially converted to in-situ produce zeolite under hydrothermal conditions to form composite adsorbents comprised of zeolite and activated carbon.

Another aspect of the present invention is a method of producing zeolite and carbon composite adsorbents with desired shapes and sizes by forming the mixture composition into desired forms through mixing, shaping, alkali activation, and hydrothermal treatment. Mixing of the geopolymer material, carbonaceous material, and alkali activating agent produces a paste mixture with uniform composition and desired rheology for the shaping of adsorbents. The paste mixture is processed using common shaping methods such as granulation or extrusion to form granules or pellets with suitable sizes for adsorption and separation processes. The granules or pellets are subjected to chemical activation at high temperatures using the alkali activating agent included in the composition to convert the carbonaceous material to activated carbon. The activated granules or pellets are hydrothermally treated to convert at least part of the geopolymer material to zeolite. The produced zeolite and carbon composite adsorbents are washed with de-ionized water and dried for adsorption applications.

The zeolite and carbon composite adsorbents disclosed in the instant invention may be used in any applications requiring the use of adsorbents, including adsorption, purification, or other separation applications of liquids and gases.

BRIEF DESCRIPTION OF THE DRAWINGS

FIG. 1 illustrates as a flow diagram the process steps for manufacturing the composite adsorbents of the instant invention.

FIGS. 2A and 2B shows two optical images of composite adsorbent granules of Example 1 in different size ranges. FIG. 2A shows 10-20 mesh; FIG. 2B shows 20-40 mesh.

DETAILED DESCRIPTION OF THE INVENTION

Figure 3A:
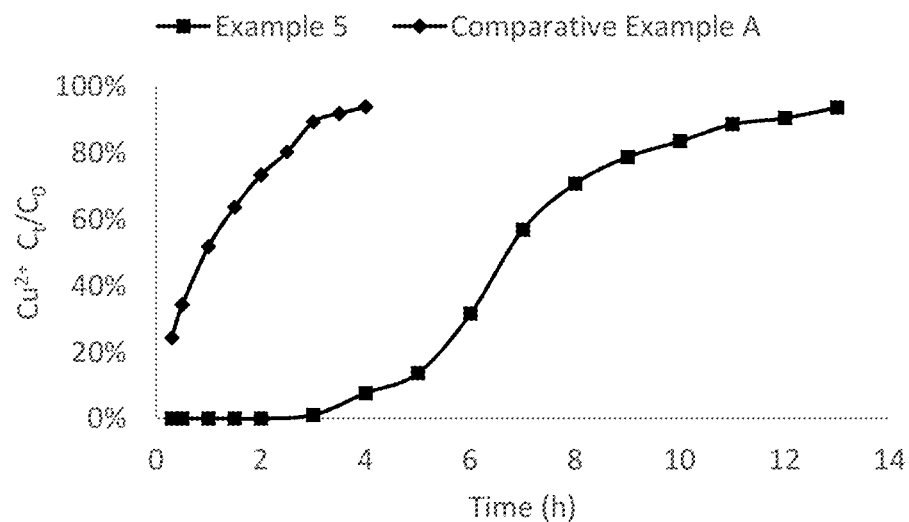
FIGS. 3A and 3B graphically plots the adsorption performance evaluation breakthrough curves of the adsorbents in Example 5 and Comparative Example A.

It is understood that the terminology used herein is for the purpose of describing particular embodiments only and is not intended to be limiting. As used in this specification, the singular forms "a", "an", and "the" include plural referents unless the content clearly indicates otherwise. The following terms in the Glossary as used in this application are to be defined as stated below and for these terms, the singular includes the plural.

Various headings are present to aid the reader, but are not the exclusive location of all aspects of that referenced subject matter and are not to be construed as limiting the location of such discussion.

Glossary

Ambient temperature means room temperature, usually from 20-25° C.

wt % means percent by weight

Discussion

The instant invention discloses a composition and a process for producing composite adsorbents comprised of zeolite and carbon having desired shapes and sizes for adsorption applications, made by mixing together components of a geopolymer material, a carbonaceous material, and an alkali activating agent, wherein the alkali activating agent to carbonaceous material solid mass ratio of at least 0.25:1, respectively, to produce a paste mixture having a uniform composition and desired rheology for shaping; processing the paste using common adsorbent shaping methods, including granulation or extrusion, to form granules or pellets to achieve suitable sizes for adsorption processes; chemically activating the carbonaceous material at a temperature generally higher than 400° C., preferably in the range of 400-1,000° C., in an inert gas, such as $N_2$, using the alkali activating agent included in the composition to in-situ produce activated carbon; conducting hydrothermal treatment to convert part of the geopolymer to zeolite; washing and drying the produced zeolite and carbon composite adsorbents for adsorption applications. FIG. 1 illustrates these process steps as a flow diagram for manufacturing composite adsorbents of the instant invention.

Geopolymers are a class of aluminum silicate inorganic polymers which have an amorphous 3-dimensional polysialate network consisting of $SiO_4$ and $AlO_4$ tetrahedra. The formation of a geopolymer involves an aluminosilicate source material and an alkali silicate activator solution. In a typical synthesis, calcined clay or fly ash is mixed with alkali silicate solutions to form a geopolymer. The geopolymerization process consists of three stages: 1) dissolution of aluminum and silicon ions from the aluminosilicate source to form mobile monomers through the reaction with hydroxide ions; 2) re-orientation and re-arrangement of the monomers and formation of larger oligomers; 3) polycondensation of oligomers to form rigid 3-dimensional network of oxygen bonded $SiO_4$ and $AlO_4$ tetrahedra.

Geopolymer materials can set at ambient temperature and achieve many excellent material properties such as high strength as well as thermal and chemical stabilities. One typical characteristic of geopolymers is their ability to set and develop material strength at ambient or slightly elevated temperature after mixing. They have been used in a number of applications such as construction cement and refractory materials. Geopolymerization process starts as soon as an alkali silicate activator is mixed with an aluminosilicate source material. Geopolymers typically set in a few hours, during which the mixture develops rigid polymeric network, loses plasticity and becomes hard, and achieves high material strength.

Activated carbon can be manufactured from carbonaceous materials, including coal, petroleum coke, biomass, and others. Due to abundant availability and low cost of biomass wastes, they have been increasingly used as the raw material for activated carbon production. Activated carbon can be produced by physical or chemical activation methods. The physical activation method is comprised of two main processes: carbonization and activation by steam or $CO_2$. Chemical activation is a single step process conducted in the presence of activating agents such as alkali hydroxide, phosphoric acid, $ZnCl_2$, etc. Chemical activation generally occurs at a lower temperature than physical activation (generally >800° C.). It has been reported that when an alkali hydroxide such as NaOH is used as the activating agent, high surface area activated carbons are produced.

In the instant invention, it has now been found that mixing a geopolymer material, a carbonaceous material, and an alkali activating agent at an alkali activating agent to carbonaceous material solid mass ratio of at least 0.25:1, respectively, prepares a paste mixture with uniform composition and desired rheology, enables effective shaping of the paste mixture to form granules or pellets with desired shapes and sizes using common adsorbent shaping methods, such as granulation or extrusion, and allows development of sufficient material strength in a short time period through geopolymerization at ambient or slightly elevated temperature for further processing to produce composite adsorbents.

After a geopolymer material is prepared and mixed with a carbonaceous material and an activating agent to produce a uniform paste, the geopolymerization process starts. As geopolymer materials generally take a few hours of time to cure and harden at ambient temperature, the paste mixture can be processed to granules using granulation methods or pellets using extrusion methods. After granules or pellets are formed, they can be kept at ambient temperature to cure or heated to an elevated temperature, which is generally lower than 150° C., to accelerate curing to develop sufficient material strength for further processing such as sieving, activation, and hydrothermal treatment.

The instant invention has now shown that most carbonaceous materials, including coal, petroleum coke, biomass, and others commonly used to manufacture activated carbon can be processed to particle sizes smaller than that of granules or pellets and can produce and form well-mixed paste mixtures with geopolymer materials. Additionally, biomass materials can be pre-mixed with alkali activating agent solutions to age and optionally heated to soften and break down biomass materials for easy processing and improved uniformity. Furthermore, the pre-mixing and aging of biomass materials with alkali activating agent solutions also improve alkali activation of the biomass mass to produce activated carbon.

For carbonaceous materials such as coal, charcoal, and other easy-to-grind materials, they can be conveniently ground to produce powders and form uniform paste mixtures with geopolymer materials. For paste like carbonaceous materials such as petroleum asphalt, they can be directly mixed with geopolymer materials to produce uniform mixtures. For biomass carbonaceous materials such as wood, they can processed to produce sawdust, pre-mixed with alkali activating agents such as NaOH solutions to break down the materials, or pyrolyzed to produce charcoal for easy grinding. The processing of carbonaceous materials to small particle sizes not only improve the uniformity of the composite composition but also enhance the alkali activation and hydrothermal treatment processes to produce activated carbon and zeolite in the composite adsorbents.

It is advantageous to use alkali activating agents such as alkali hydroxides at an alkali activating agent to carbonaceous material solid mass ratio of at least 0.25:1, more preferable to be at least 0.5:1, and even more preferable to be at least 1:1 in the mixture composition to manufacture zeolite and carbon composite adsorbents. Alkali hydroxides such as NaOH not only act as the activation agent to chemically convert carbonaceous materials to activated carbon but also provide the necessary alkali components for the effective conversion of geopolymer to zeolite. In addition, adding alkali hydroxide activating agents helps the dissolution of aluminosilicate material in the geopolymer composition and improve the geopolymerization process.

The alkali activating agent can be added as a part of the geopolymer material composition or in addition to the geopolymer material and carbonaceous material mixture. The alkali activation of carbonaceous materials in the mixture composition can be conducted in an inert gas such as nitrogen or others, at a temperature of higher than 400° C., generally between about 400 and about 1,000° C. It is also now found that alkali activation also facilitates the conversion of geopolymer to zeolite under hydrothermal conditions.

After the alkali activation of the mixture composition, the activated granules or pellets can be hydrothermally treated to convert part of geopolymer to zeolite. Since geopolymer is an aluminum silicate material, depending on the composition, geopolymer can be partly converted to zeolite by hydrothermal treatment in water, an alkali solution, or other media. The zeolite hydrothermal synthesis normally comprises heating the geopolymer material to a temperature between about 30 and about 200° C. for a period of time between 1 and 168 hours to produce the desired zeolite. The type of zeolite formed after the hydrothermal treatment depends on the geopolymer composition and hydrothermal conditions and includes A, X, Y, T, P, β, mordenite, and other zeolites. After hydrothermal treatment, the in-situ produced zeolite and carbon composite adsorbents are washed and dried for adsorption applications.

The instant invention provides a unique mixture composition and advantageous manufacturing process to produce high performance and low cost zeolite and carbon composite adsorbents with desired shapes and sizes. Instead of using expensive zeolite and activated carbon as the raw materials to produce zeolite-carbon composite adsorbents, low cost and abundant geopolymer materials and carbonaceous materials such as biomass are used to prepare mixture compositions for composite adsorbent fabrication. The mixture compositions can be easily shaped using common shaping methods to produce granules or pellets with suitable sizes and good strength. The use of alkali activating agents in the mixture composition not only enables geopolymerization to provide good material strength but allows chemical activation of carbonaceous materials to activated carbon and facilitates effective conversion of geopolymer to zeolite to form zeolite-carbon composite adsorbents.

This process can be further understood by referring to the flow diagram of FIG. 1 as discussed below:

Geopolymer materials according to Step 1 of FIG. 1 can be prepared by mixing an aluminosilicate source material, an alkali activator material, and a carrier fluid. The general formula of geopolymers is $M_n[—(SiO2)_z—(AlO2)-]_n$, where M is a monovalent cation, z is the ratio of Si to Al, and n is the degree of polymerization. M is typically an alkali metal such as lithium, sodium, potassium, or other monovalent cation and z is typically 1, 2, 3, or up to 32. The geopolymer materials can be prepared using any suitable composition defined by the general formula of a geopolymer.

The geopolymer composition according to Step 1 of FIG. 1 generally includes an aluminosilicate source. Exemplary aluminosilicate materials include, but are not limited to metakaolin, calcined kaolin clays, fly ash, blast furnace slags, aluminum-containing silica fume, and others. It is preferred that the aluminosilicate source is metakaolin, calcined clays, fly ash, slags, or a combination of two or more of these materials.

The geopolymer composition according to Step 1 of FIG. 1 generally includes an alkali silicate activator. The alkali silicate activator generally comprises an alkali metal or alkaline earth metal silicate component. References herein to "alkali" compounds are intended to refer to alkali metals (e.g., Li, Na, and K) and alkaline earth metal (e.g., Mg, Ca) compounds. The alkali silicate component comprises at least one of sodium silicate, potassium silicate, lithium silicate, calcium silicate or magnesium silicate. The alkali silicate component preferably comprises sodium silicate.

The geopolymer composition according to Step 1 of FIG. 1 generally includes a carrier fluid. The carrier fluid can be water, organic solvents, other liquids, or a combination of two or more fluids. It is preferred that the carrier fluid is water. If the aluminosilicate source or metal hydroxide activator is already in a liquid state, it is considered that the geopolymer composition already has a carrier fluid present.

The carbonaceous materials according to Step 1 of FIG. 1 are materials that contain a large carbon content. Examples of carbonaceous materials include coal, petroleum coke, asphalt, wood, bamboo, coconut husk, lignite, rice husk, waste rubber tire, and others. Depending on the nature of carbonaceous materials, they can be used directly to mix with geopolymer materials, ground or pyrolyzed before grinding to obtain a powder form, or pre-treated with chemicals such as alkali hydroxide to break down the materials for easy processing.

The alkali activating agents according to Step 1 of FIG. 1 generally includes an alkali metal or alkaline earth metal hydroxide or salt commonly used for chemical activation to produce activated carbon. The alkali hydroxide component comprises at least one of sodium hydroxide, potassium hydroxide, lithium hydroxide and the like, preferably sodium hydroxide. The alkali activating agent to carbonaceous material solid mass ratio in the mixture composition is preferably at least 0.25:1, more preferably at least 0.5:1, and even more preferably at least 1:1. The alkali activating agents can be added as a part of the geopolymer material composition or in addition to the geopolymer material and carbonaceous material mixture.

The adsorbent shaping method according to Step 2 of FIG. 1 include granulation, extrusion, and other adsorbent manufacturing methods. Adsorbent granulation methods such as wet granulation, dry granulation, spray drying, and others are commonly used to produce adsorbent granules. Extrusion methods are generally used to produce adsorbent pellets in cylindrical or other shapes.

The curing of the composition according to Step 3 of FIG. 1 can be conducted at ambient temperature or by raising the temperature of the mixture composition by providing a heat source. The heating can be achieved by convection, radiation, or conduction methods. The curing can be carried out at a temperature between about 20 and about 150° C., preferably between about 40 and about 100° C., more preferably between about 50 and about 80° C. The curing of the geopolymer composition may be conducted generally between 1 and 72 hours, preferably between about 4 to about 48 hours, and more preferably between about 8 to about 24 hours. The curing of the mixture composition may be carried out in presence of air, moisture, steam, flue gas, water, solvents, or other gases or liquids. Most preferably the curing is carried out in the presence of moisture, water, or steam.

The alkali activation of carbonaceous materials in the mixture composition according to Step 4 of FIG. 1 can be conducted in inert gases such as nitrogen, argon, helium or others in the presence of an alkali activating agent at a temperature generally between about 400 and about 1,000° C., preferably between about 500 and about 900° C., and more preferably between about 600 and about 800° C. to produce activated carbon. Optional treatment in $CO_2$, steam, or other gases may be conducted to further improve the properties of the activated carbon.

The hydrothermal treatment of an activated mixture composition according to Step 5 of FIG. 1 is carried out by heating in a hydrothermal treatment medium at a temperature necessary to convert at least part of the geopolymer into a zeolite. Depending on the type of geopolymer composition and desired zeolite type, the hydrothermal treatment is generally performed at a temperature below about 250° C., advantageously below about 200° C., preferably below about 150° C. and within the range of about 40 to about 150° C., and most preferably within the range of about 60 to about 120° C. The hydrothermal treatment time is generally between 1 and 168 hours, preferably between 1 and 72 hours, more preferably between 2 to 48 hours, even more preferably between 4 to 24 hours.

The invention will be further clarified by a consideration of the following examples, which are intended to be purely exemplary of the invention.

Materials and Equipment:

activated carbon adsorbents were purchased as Filtrasorb 300 from Calgon Carbon, Moon Township, Pa.

h means hour

L means liter metakaolin was purchased as PowerPozz metakaolin from Advanced Cement Technologies, Blaine, Wash.

meq means milliequivalent ppm means parts per million sodium silicate solution was purchased as Grade 40 from Occidental Chemical Corporation, Dallas, Tex.

sodium hydroxide was purchased as 50% caustic soda diaphragm from Occidental Chemical Corporation, Dallas, Tex.

zeolite adsorbents were obtained as 13X zeolite beads from UOP, Des Plaines, Ill.

Example 1

A composite mixture composition is prepared by mixing and aging wood sawdust with a sodium hydroxide activating agent solution at ambient temperature for overnight, mixing metakaolin with a sodium silicate activator solution to prepare a geopolymer composition, and then mixing the above two mixtures right after the geopolymer preparation to produce a uniform paste mixture. The composite mixture comprises by weight 22 wt % of metakaolin, 13 wt % of sodium silicate solution, 22 wt % of dry wood sawdust, and 43 wt % of sodium hydroxide activating agent solution. The alkali activating agent (sodium hydroxide solid) to carbonaceous material (wood sawdust) solid mass ratio is 1:1.

The prepared composite paste mixture is ground in a coffee grinder and then tumbled in a rotating tumbler to shape the mixture and form green granules. The green granules are placed into a sealed container and heated at 60° C. to cure the geopolymer composition and further treat the wood material in the granules with alkali activating agent. The cured granules are transferred into a furnace and heated at 700° C. for 1 h in nitrogen to activate the wood material in the granules using the incorporated alkali hydroxide to produce activated carbon. The activated granules are subjected to hydrothermal treatment in a 1 mol/L sodium hydroxide solution at 75° C. for 24 h to form zeolite. After the hydrothermal treatment, the produced granules are washed with de-ionized water and dried at 120° C. for adsorption applications. FIG. 2 shows optical images of composite adsorbent granules in 10-20 (FIG. 2A) and 20-40 (FIG. 2B) mesh size ranges fabricated in this example.

After drying, the composite granules are ground to powder and X-ray diffraction (XRD) is conducted to characterize the crystal phases of the material. Zeolites NaX and NaA are present in the composite material with NaX as the major phase, indicating zeolites are formed from geopolymer after hydrothermal treatment.

For inorganic adsorption performance evaluation, 0.1 g of 20-40 mesh size composite granules are added into 100 mL of 200 ppm of copper sulfate solution and shaken at 100 rpm for 24 h. The copper solution is filtered after the test and its $Cu^{2+}$ concentration is analyzed using a photometer system. The composite adsorbents have a $Cu^{2+}$ adsorption capacity of 39 meq per 100 g (meq/100 g), higher than those of commercial zeolite granules (28 meq/100 g for 13X zeolite beads from UOP, Des Plaines, Ill.) and activated carbon granules (14 meq/100 g for Filtrasorb 300 from Calgon Carbon, Moon Township, Pa.).

For organic adsorption performance evaluation, 0.1 g of 20-40 mesh size composite granules are added into a 500 ppm phenol solution and shaken at 100 rpm for 24 h. The phenol concentration of the filtrate is analyzed using a gas chromatography. The composite adsorbents have a phenol adsorption capacity of 59 mg/g, higher than that of commercial zeolite granules (5 mg/g for 13X zeolite beads from UOP, Des Plaines, Ill.) but lower than that of commercial activated carbon granules (189 mg/g for Filtrasorb 300 from Calgon Carbon, Moon Township, Pa.).

Example 2

A composite mixture composition is prepared by mixing and aging wood sawdust with a sodium hydroxide activating agent solution at 60° C. for overnight, mixing metakaolin with a sodium silicate activator solution to prepare a geopolymer composition, and then mixing the above two mixtures right after the geopolymer preparation to produce a uniform paste mixture. The composite mixture comprises by weight 15 wt % of metakaolin, 9 wt % of sodium silicate solution, 22 wt % of dry wood sawdust, and 54 wt % of sodium hydroxide activating agent solution. The alkali activating agent (sodium hydroxide solid) to carbonaceous material (wood sawdust) solid mass ratio is 1.2:1.

The prepared composite paste mixture is processed using the same shaping, alkali activation, and hydrothermal process as that in Example 1. XRD analysis of the fabricated composite adsorbents shows that zeolites NaX and NaA are formed in the composite material with NaX as the major phase. The inorganic and organic adsorption performance of the composite adsorbents are subjected to the same adsorption tests as that in Example 1. The composite adsorbents have a $Cu^{2+}$ adsorption capacity of 45 meq/100 g and a phenol adsorption capacity of 71 mg/g.

Example 3

A composite mixture composition is prepared by mixing wood sawdust with a sodium hydroxide activating agent solution, mixing metakaolin with a sodium silicate activator solution to prepare a geopolymer composition, and then mixing the above two mixtures right after the geopolymer preparation to produce a uniform paste mixture. The composite mixture comprises by weight 27 wt % of metakaolin, 16 wt % of sodium silicate solution, 14 wt % of dry wood sawdust, and 43 wt % of sodium hydroxide activating agent solution. The alkali activating agent (sodium hydroxide solid) to carbonaceous material (wood sawdust) solid mass ratio is 1.5:1.

The prepared composite paste mixture is processed using the same shaping, alkali activation, and hydrothermal process as that in Example 1. XRD analysis of the fabricated composite adsorbents shows that zeolites NaX and NaA are formed in the composite material with NaX as the major phase. The inorganic and organic adsorption performance of the composite adsorbents are subjected to the same adsorption tests as that in Example 1. The composite adsorbents have a $Cu^{2+}$ adsorption capacity of 27 meq/100 g and a phenol adsorption capacity of 30 mg/g.

Example 4

A composite mixture composition is prepared by mixing and aging wood sawdust and charcoal powder with a sodium hydroxide activating agent solution, mixing metakaolin with a sodium silicate activator solution to prepare a geopolymer composition, and then mixing the above two mixtures right after the geopolymer preparation to produce a uniform paste mixture. The composite mixture comprises by weight 13 wt % of metakaolin, 8 wt % of sodium silicate solution, 16 wt % of dry wood sawdust, 8% of wood charcoal powder, and 55 wt % of sodium hydroxide activating agent solution. The alkali activating agent (sodium hydroxide solid) to carbonaceous material (wood sawdust and charcoal powder) solid mass ratio is 1.1:1.

The prepared composite paste mixture is processed using the same shaping, alkali activation, and hydrothermal process as that in Example 1. XRD analysis of the fabricated composite adsorbents shows that zeolites NaX and NaA are formed in the composite material. The inorganic and organic adsorption performance of the composite adsorbents are subjected to the same adsorption tests as that in Example 1. The composite adsorbents have a $Cu^{2+}$ adsorption capacity of 37 meq/100 g and a phenol adsorption capacity of 79 mg/g.

Example 5

A composite mixture composition is prepared by mixing metakaolin with a pre-mixed sodium silicate and sodium hydroxide activator solution to prepare a geopolymer composition, and then mixing the above geopolymer with wood sawdust to produce a uniform paste mixture. The composite mixture comprises by weight 18 wt % of metakaolin, 10 wt % of sodium silicate solution, 18 wt % of dry wood sawdust, and 54 wt % of sodium hydroxide activating agent solution.

The prepared composite paste mixture is processed using the same shaping, alkali activation, and hydrothermal process as that in Example 1, except that the alkali activation temperature is 750° C. XRD analysis of the fabricated composite adsorbents shows that zeolites NaX and sodalite are formed. The composite adsorbents are calcined in air at 850° C. to determine their carbon content, which is about 20 wt %. For inorganic and organic adsorption performance evaluation, 2.5 g of 20-40 mesh size composite granules are used to conduct fixed bed breakthrough curve analysis. A test column with 1 cm inner diameter is used. An influent solution with 400 ppm of $Cu^{2+}$ and 1000 ppm of phenol is used with a flow rate of 1 mL/min. Effluent samples are analyzed to determine the effluent pollutant concentration at a given time ($C_t$). Breakthrough curves are plotted using the ratio of effluent pollutant concentration ($C_t$) over influent pollutant concentration ($C_0$) with respect to time.

Figure 3B:
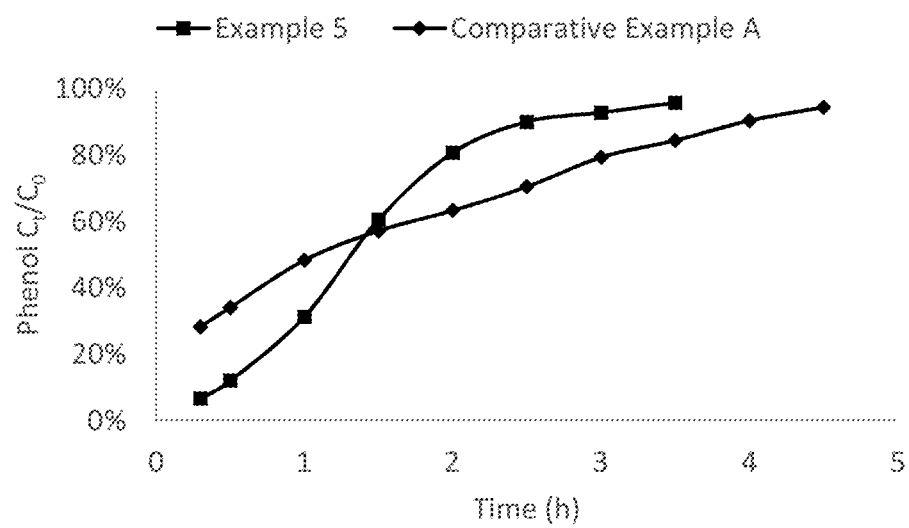

Breakthrough curves for the adsorption of $Cu^{2+}$ and phenol on the composite adsorbents in this example is shown in FIG. 3. Breakthrough curves for the adsorption of $Cu^{2+}$ on the composite adsorbents (FIG. 3A) indicates that the composite adsorbents are more effective in removing inorganic pollutants and also have a greater adsorption capacity than a hybrid activated carbon and zeolite adsorbents in Comparative Example A. Breakthrough curves for the adsorption of phenol on the composite adsorbents (FIG. 3B) implies that the composite adsorbents have organic adsorption effectiveness and capacity close to those of the hybrid activated carbon and zeolite adsorbent systems in Comparative Example A.

Comparative Example A

For the treatment of complex wastewater containing both inorganic and organic pollutants, to improve pollutant adsorption performance, hybrid adsorbent systems consisting of zeolite and activated carbon in series are used in industrial applications. Since there are about 20% by weight of carbon in the composite adsorbents in Example 5, to compare fixed bed adsorption performance of the composite adsorbents against the hybrid adsorbent systems, a hybrid adsorbent system containing 20 wt % of activated carbon adsorbents followed by 80 wt % of zeolite adsorbents are used. In each test, 2.5 g of hybrid adsorbents are used and the test conditions are the same as those used as in Example 5. Breakthrough curves for the adsorption of $Cu^{2+}$ and phenol on the hybrid adsorbents in this example are shown in FIG. 3A and FIG. 3B.

Comparative Example B

To evaluate the feasibility of using a mixture composition comprised of a geopolymer material, a carbonaceous material, and an ex-situ produced, pre-synthesized zeolite material to in-situ produced activated carbon by alkali activation at high temperatures and fabricate zeolite and activated carbon composite adsorbents, a commercial zeolite powder is employed to replace a portion (up to 20%) of the metakaolin material used in Example 5 while keeping other material components the same to prepare a composite paste mixture containing pre-synthesized zeolite material. The zeolite containing composite paste mixture is processed using the same shaping, curing, and alkali activation process.

XRD analysis of the cured composite mixture shows that zeolites NaX is present in the mixture along with amorphous geopolymer material, indicating that zeolite NaX has been incorporated in the mixture. However, after alkali activation of the cured mixture at 750° C. in nitrogen to activate the wood material in the mixture to produce activated carbon, XRD analysis of the activated composite mixture shows that the zeolite phase is no longer present in the mixture, suggesting that the incorporated zeolite NaX has been destroyed by the carbon alkali activation process. Therefore, using a mixture composition comprised of a geopolymer material, a carbonaceous material, and an ex-situ produced, pre-synthesized zeolite material to in-situ produce activated carbon by alkali activation at high temperatures will not lead to the formation of zeolite and activated carbon composite adsorbents.

Although the invention has been described with reference to its preferred embodiments, those of ordinary skill in the art may, upon reading and understanding this disclosure, appreciate changes and modifications which may be made which do not depart from the scope and spirit of the invention as described above or claimed hereafter. Accordingly, this description is to be construed as illustrative only and is for the purpose of teaching those skilled in the art the general manner of carrying out the invention.

What is claimed is:

1. A process for producing composite adsorbents having components of geopolymer, zeolite, and activated carbon, comprising:
   (a) mixing a geopolymer material which comprises an aluminosilicate source, an alkali silicate activator, and a carrier fluid in the composition, a carbonaceous material, and an alkali activating agent, wherein the alkali activating agent to carbonaceous material solid mass ratio is at least 0.25:1, respectively, to produce a paste mixture wherein the paste mixture has a uniform composition and desired rheology for shaping,
   (b) fabricating the paste mixture using common adsorbent shaping methods to form granule or pellet compositions possessing sizes from 0.2 to 5 mm for adsorption processes,
   (c) curing the granule or pellet compositions to increase strength through geopolymerization,
   (d) chemically activating the carbonaceous material in the granule or pellet compositions at a temperature of greater than about 400° C. in an inert gas using the alkali activating agent present in the compositions to in-situ produce activated carbon,
   (e) conducting hydrothermal treatment of the composition to convert part of the geopolymer to in-situ produce zeolite and form the composite adsorbents, and
   (f) washing and drying the produced composite adsorbents.

2. The process of claim 1 (a), wherein the geopolymer material is a class of aluminum silicate inorganic polymers which have an amorphous 3-dimensional polysialate network consisting of $SiO_4$ and $AlO_4$ tetrahedra.

3. The process of claim 1 (a), wherein the carrier fluid is water.

4. The process of claim 1 (a) wherein the carbonaceous material is coal, petroleum coke, charcoal, petroleum asphalt, waste rubber tire, or biomass.

5. The process of claim 1 (a), wherein the alkali activating agent is an alkali metal or alkaline earth metal hydroxide or salt.

6. The process of claim 5, wherein the alkali metal hydroxide is at least one of sodium hydroxide, potassium hydroxide, or lithium hydroxide.

7. The process of claim 5, wherein the alkali activating agent is sodium hydroxide.

8. The process of claim 1 (a), wherein the ratio of the alkali activating agent to carbonaceous material solid mass ratio is at least 0.5:1.

9. The process of claim 1 (a), wherein the ratio of the alkali activating agent to carbonaceous material solid mass ratio is at least 1:1.

10. The process of claim 1 (d), wherein the inert gas is nitrogen.

11. The process of claim 1 (c), wherein the curing is done at a temperature from about 20 to about 150° C., conducted over 1 to 72 hours.

12. The process of claim 1 (c), wherein the curing in done in the presence of moisture, water or steam.

13. The process of claim 1 (d), wherein the temperature is from about 400 to about 1,000° C.

14. The process of claim 1 (e), wherein the temperature of the hydrothermal treatment is below about 250° C. and is done in the presence of water or an alkali solution.

15. A composite adsorbent comprising a mixture of geopolymer, zeolite, and activated carbon whenever produced by the process of claim 1.

16. A process for preparing a composite adsorbent having a geopolymer, zeolite, and activated carbon, wherein the improvement comprises the steps of:
   (a) preparing a geopolymer material which comprises an aluminosilicate source, an alkali silicate activator, and a carrier fluid in the composition,
   (b) chemically activating a carbonaceous material in a granule or pellet composition form, at a temperature of greater than about 400° C., in an inert gas, using an alkali activating agent present in the compositions to in-situ produce activated carbon, and
   (c) conducting hydrothermal treatment of the composition of step (a) to convert part of the geopolymer to in-situ produce zeolite and form the composite adsorbent.

17. The process of claim 16 (a), wherein the temperature is from about 400 to about 1,000° C.

18. The process of claim 16 (b), wherein the temperature of the hydrothermal treatment is below about 250° C. and is done in the presence of water or an alkali solution.

19. The process of claim 1 (b), wherein the adsorbent shaping methods are granulation or extrusion.

20. The process of claim 4, wherein the biomass is derived from wood, bamboo, coconut husk, lignite, or rice husk.

* * * * *